Figures 3, 4:
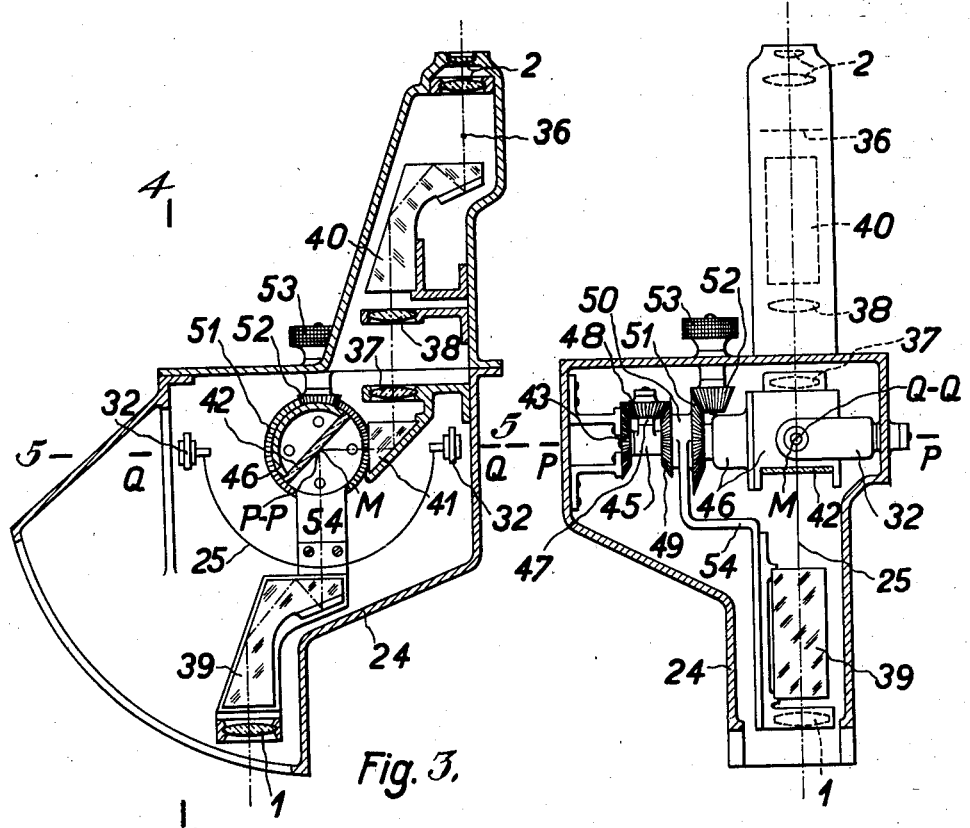

Dec. 18, 1934.    O. BURKHARDT    1,985,077
SIGHTING TELESCOPE FOR AIRCRAFT
Filed Aug. 1, 1931    2 Sheets-Sheet 1

Inventor:
Otto Burkhardt

Dec. 18, 1934.  O. BURKHARDT  1,985,077
SIGHTING TELESCOPE FOR AIRCRAFT
Filed Aug. 1, 1931  2 Sheets-Sheet 2

Inventor:
Otto Burkhardt

Patented Dec. 18, 1934

1,985,077

UNITED STATES PATENT OFFICE 1,985,077

SIGHTING TELESCOPE FOR AIRCRAFT

Otto Burkhardt, Jena, Germany, assignor to firm N. V. Nederlandsche Instrumenten Compagnie, of Haag Application August 1, 1931, Serial No. 554,515
In Germany August 8, 1930

5 Claims. (Cl. 88—1)

I have filed an application in Germany, August 8, 1930.

The invention concerns a sighting telescope which is to be mounted in an aircraft for rotation about an azimuthal axis and which contains optical members determining a line of sight for aiming at targets, at least the foremost part of these optical members being movable relatively to the aircraft in such a manner that that part of the line of sight which is directed to the target may be adjusted in a plane parallel to the said axis, the said optical members comprising a lens and a side mark, stabilizing means being provided for influencing the side mark.

When using telescopes of the above description it is not taken into account, that a deviation of the viewing direction from the vertical line makes an influence bear upon the stabilization of the sighting line relative to the sideward oscillations of the aircraft, that for instance a vertical viewing direction requires the sighting line to be adjusted by the entire angle of the sideward oscillation, and that a sideward stabilization must be dispensed with in the case of a horizontal viewing direction. As a consequence, the stabilizing appliances are really accurate only when the viewing direction is vertical, and this accuracy diminishes the more, the more the viewing direction approaches the horizontal plane.

For the purpose of attaining that that part of the sighting line which is directed to the target is given a position which, regardless of the value of the altitudinal angle of the said part of the sighting line, is independent of the sideward oscillations of the aircraft, the invention provides that the said side mark is given the form of a circular arc and is cardanically so attached to the telescope that the point of intersection of the two Cardan axes coincide with the centre of the arc and that the movable Cardan axis coincides with a diameter of the arc.

The most simple constructional form of a telescope of this kind is obtained when, for the purpose of adjusting the altitudinal angle, the whole telescope is made rotatable relatively to its support. Other constructional forms are obtained by making rotatable only parts of the telescope and this for the purpose of adjusting the altitudinal angle. Further variations can be attained by arranging the sidemark in different manners.

If for the purpose of adjusting the altitudinal angle a mirror is rotatably disposed in front of the telescope in such a manner that it can be turned relatively to the rear part of the telescope in its main reflection plane, one constructional form is obtained for instance by arranging the sidemark outside the ray path producing an image of the landscape and by providing means for making this mark, together with the landscape, visible in the telescope. For viewing the mark these means are provided with a mirror the main reflection plane of which is parallel to that of the mirror in front of the telescope and which is mounted on the telescope for rotation in its main reflection plane about an axis containing the intersection point of the Cardan axes of the mark bearing and lying in the reflection surface of the mirror, both mirrors being so coupled to each other that they are always parallel to each other.

Another constructional form is obtained, when the side mark is provided in the ray path projecting the landscape and when its bearing is cardanically disposed on the telescope in such a manner that the fixed Cardan axis is prependicular to the main reflection plane of the mirror in front of the telescope and that its movable cardan axis lies in this main reflection plane, when further a pendulum is so disposed on the bearing for the movable Cardan axis of the mark that it swings in a plane which is perpendicular to this main reflection plane and is vertical when the aircraft is in horizontal position, and, finally, when the mark is so coupled to the mirror in front of the telescope and to the pendulum that, by turning the mirror in front of the telescope relatively to the rear part of the telescope, it is rotated about its fixed Cardan axis by the double angle and, when the pendulum is caused to oscillate by sideward movements of the aircraft, it is rotated about its movable Cardan axis by the same angle.

Another constructional form of the said kind is obtained when the side mark is arranged in the ray path projecting the image of the landscape and when, for the purpose of adjusting the altitudinal angle of the front part of the sighting line, a mirror (instead of being placed in front of the telescope) is disposed inside the telescope in such a way that it is rotatable relatively to the telescope about an axis which contains the point of intersection of the cardan axes of the mark bearing, lies in the reflection plane of this mirror and, when the aircraft assumes a horizontal position, is perpendicular to the plane determined by the mark, and when the mirror as well as the objective of the telescope are so coupled with each other that turning the mirror about a certain angle causes the objective to be turned about twice this angle.

Figures 1, 5:
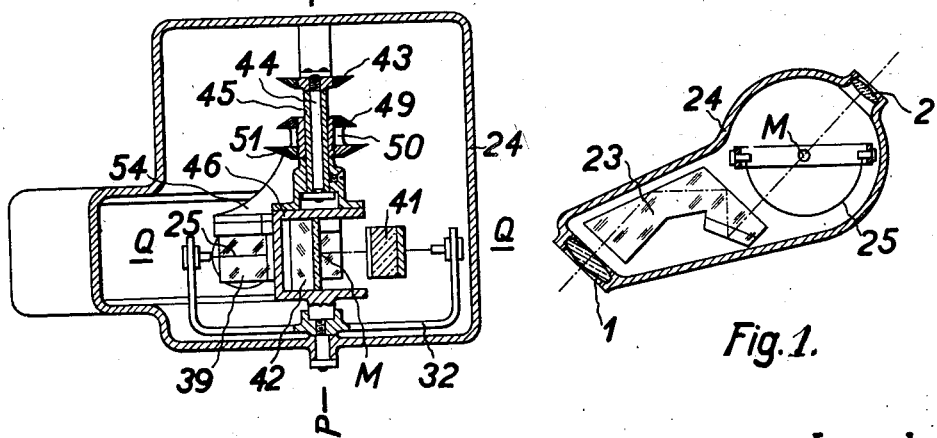
Figure 6:
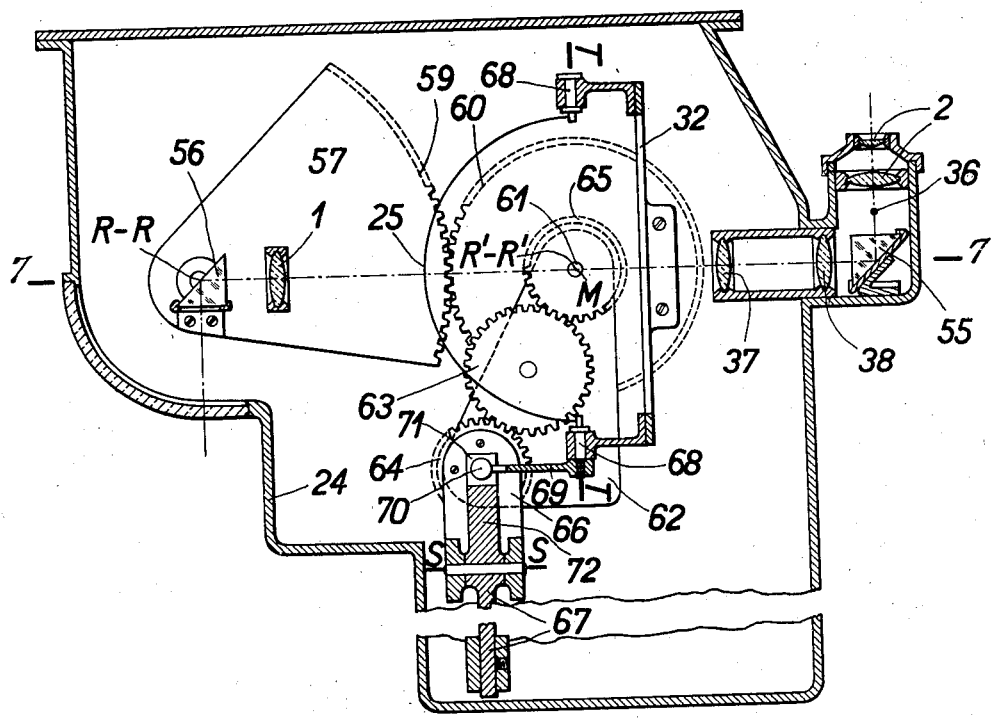
Figure 7:
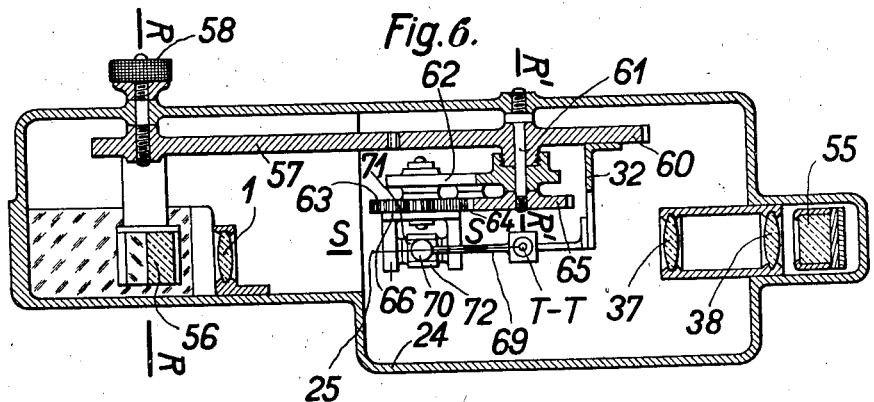
Figure 2:
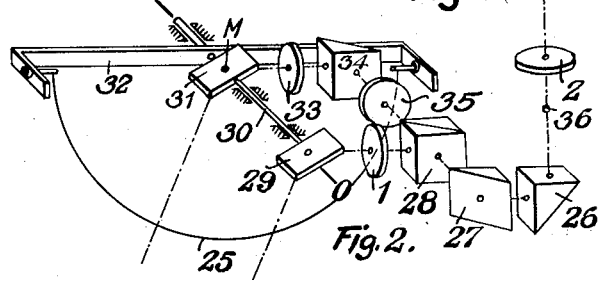

The annexed drawings show more or less schematically four different constructional examples of a sighting telescope according to the invention. The telescope illustrated by Figure 1, which is shown in a vertical section along its optical axis, is provided with a prismatic reversing system. Figure 2 illustrates in a perspective view a sighting telescope of the astronomical kind. The two other illustrated telescopes are provided with lenticular reversing systems. One of these two telescopes is illustrated by Figures 3 to 5. Figure 3 represents a vertical section along the optical axis of the telescope. Figure 4 shows another vertical and Figure 5 a horizontal section along the respective section lines in Figure 3. Figures 6 and 7 represent the other telescope. Figure 6 shows a vertical section along the optical axis of the telescope and Figure 7 a horizontal section along the section line in Figure 6.

The telescope according to Figure 1 comprises the following optical members: An objective 1, an ocular 2 and a reversing prism 23. On the tube 24 of the telescope a mark 25 assumed to swing like a pendulum (in the drawings it is assumed for the sake of simplicity that the mark swings under the influence of its own weight) and having the form of a circular arc with the centre M is cardanically mounted in such a manner that the Cardan centre coincides with the centre M and has such a position on the axis of the ocular 2 that the circular mark 25 touches the image plane of the telescope. The position of the circular mark is further determined by the fact that, when the plane determined by the optical axis of the telescope has a vertical position, it lies in this plane. The telescope must be assumed to be disposed on the aircraft in such a manner that, supposed the aircraft assumes a horizontal position, it can be turned about a vertical axis so as to counteract the drift caused by the wind, and that it can be turned about a horizontal axis so as to allow targets which are far ahead and lie in the vertical plane through the direction of flight of the aircraft to be brought into the field of view of the telescope. The mark 25 has the effect of a sidemark. The telescope has no special altitudinal mark so that it can be used solely for the purpose of directing the aircraft into a definite direction of flight. The circular form of the mark 25 serves the purpose of making the effective chord length of the angle of oscillation of the mark depend on the inclination of the axis of the objective 1 when the aircraft oscillates sidewardly. The chord length is greatest when the objective axis is vertical; it decreases in proportion to the increasing inclination of the said axis relative to the vertical line, and it assumes the value zero when the objective axis becomes horizontal.

The telescope according to Figure 2 comprises the following optical members: An objective 1, an ocular 2, two single reflecting prisms 26 and 27, a double prism 28 the cemented surface of which is partly reflecting and partly transparent, and a mirror 29. By means of a shaft 30, whose axis O—O perpendicularly intersects the axis of the objective 1, perpendicularly crosses the axis of the ocular 2 and lies in the reflection plane of the mirror 29, this mirror is rotatably mounted on the telescope tube (which, for the sake of simplicity, is left away in the drawings) in such a manner as to permit of altering the altitudinal angle of the viewing direction. The shaft 30 also carries a mirror 31 the reflecting surface of which coincides with that of the mirror 29. On the telescope tube, by means of a frame 32, a mark 25 of the form of the arc of a circle the centre M of which lies on the axis O—O approximately in the centre of the reflecting surface of the mirror 31, is cardanically mounted in such a manner that the Cardan centre coincides with M and the fixed Cardan axis with the axis O—O. The plane determined by the circular mark 25 is perpendicular to the axis O—O when this axis is horizontal. Behind the mirror 31 is disposed a lens 33 which is given such a focal length that the reflected image of the circular mark 25 relative to the mirror 31 lies in the focal plane of the lens. This lens, together with a single reflecting prism 34, the double prism 28 and a lens 35 whose focal length is equal to that of the objective 1 and which is at the same distance from the double prism 28 as the objective 1, serve the purpose that the mark 25, together with the target aimed at by the mirror 29, are imaged in the image plane of the telescope. In the image plane is provided an altitudinal mark 36. For the sake of simplicity this mark 36 is assumed to be fixed in the constructional example represented by the drawings; in reality, however, this mark ought to be suitably provided under pendulum effect.

The tube of the telescope must be assumed to be so disposed in an aircraft that it can be turned relatively to the aircraft about an axis which is parallel to that of the ocular 2 and which is vertical when the aircraft assumes horizontal position, so as to counteract the drift caused by the wind. The effect of the circular mark 25 is the same as described with respect to the constructional example according to Figure 1.

The telescope according to Figures 3 to 5 comprises the following optical members: An objective 1, an ocular 2, a collective 37, a reversing lens 38, two reversing prisms 39 and 40, a single reflecting prism 41 and a mirror 42, whereof the members 2, 37, 38, 40 and 41 are fixed to the tube 24 of the telescope. The mirror 42 as well as the objective 1 together with the reversing prism 39 are mounted for rotation about an axis P—P which lies in the reflection surface of the mirror 42, intersects the optical axis of the telescope and is perpendicular to the main reflection plane of the mirror 42 coinciding with the optical axis of the telescope. The arrangement is as follows: The one crown wheel 43 of a differential gear is so fixed to the tube 24 that its axis coincides with the turning axis P—P. To this wheel 43 is screwed a shaft 44 the axis of which also coincides with the turning axis P—P and supports a hollow shaft 45. This hollow shaft is rigidly connected to the mount 46 of the mirror 42. The planet wheel 48 of the said differential gear is rotatably mounted on a pin 47 which is fixed to the hollow shaft 45 and whose axis perpendicularly intersects the turning axis P—P. The other crown wheel 49 of the differential gear belongs to a wheel body 50 which is rotatably mounted on the hollow shaft 45 and has bevel wheel teeth 51, by means of which it can be turned by a milled head 53, and a bevel wheel 52 mounted on the tube 24. To this wheel body 50 are fixed a support 54 for the objective 1 and the reversing prism 39. On the tube 24 is mounted a frame 32 which is rotatable about an axis coinciding with the turning axis P—P. In this frame 32 is mounted a mark 25 which rotates about an axis Q—Q perpendicularly intersecting the axis P—P in a point M lying on the optical axis of the telescope. This mark 25 has the form of the arc of a circle which has M for its centre.

and whose radius is of such a length that the mark touches the objective image plane of the telescope. When the turning axis P—P is horizontal the plane determined by the circular mark 25 coincides with the plane determined by the optical axis of the telescope. In the ocular image plane of the telescope is provided an altitudinal mark 36. In the construction example represented in the drawing this mark is assumed to be fixed for the sake of simplicity; however, it ought to be suitably provided under pendulum effect.

The tube 24 of the telescope must be assumed to be disposed in an aircraft in such a manner that, in order to counteract the drift caused by the wind, it is rotatable relatively to the aircraft about an axis which is parallel to the axis of the ocular 2 and which is vertical when the aircraft assumes horizontal position. The effect of the circular mark 25 is the same as that described with reference to the constructional example according to Figure 1.

The telescope represented by Figures 6 and 7 comprises the following optical members: An objective 1, an ocular 2, a collective 37, a reversing lens 38 and two single reflecting prisms 55 and 56. Except the prism 56, all of these members are fixed to the tube 24 of the telescope. The prism 56 is so disposed on a body 57 which is mounted on a tube 24 for rotation about an axis R—R and can be turned by means of a milled head 58, that the turning axis R—R lies in the reflection plane of the prism, intersects the optical axis of the telescope and is perpendicular to the main reflection plane of the prism which coincides with the optical axis of the telescope. By means of teeth 59 the body 57 meshes with a toothed wheel 60 the pitch-line diameter of which is half as great as that of the teeth 59 and which is rotatably mounted on a shaft 61 fixed to the tube 24. The axis R'—R' of this shaft 61 is parallel to the turning axis R—R. To the toothed wheel 60 is screwed a plate 62 on which are mounted two intermeshing toothed wheels 63 and 64 in such a manner as to be rotatable about axes parallel to the turning axis R'—R' of the wheel 60. The wheel 63 also meshes with a toothed wheel 65 whose pitch-line diameter equals that of the wheel 64 and which is fixed to the shaft 61 so as to be immovable relatively to the tube 24. To the body 62 is fixed a bearing 66 which carries a pendulum 67 swinging about an axis S—S parallel to the axis of the objective 1 and lying in the plane determined by the optical axis of the telescope. To the wheel 60 is fixed a frame 32 on which a mark 25 is rotatably mounted by means of two pins 68. The turning axis T—T of the mark 25, which is determined by the two pins, intersects the turning axis R'—R' in a point M lying on the optical axis of the telescope and, when the viewing direction is vertical, is parallel to the axis of the ocular 2. The mark 25 which serves as a side mark for the telescope has the form of the arc of a circle having the centre M and a radius which permits it to touch the objective image plane of the telescope. The one of the two pins 68 is screwed to an arm 69 which terminates in a ball 70. This ball 70 is guided in a groove 71 of an arm 72. This arm 72 elongates the arm of the pendulum 67, which carries the pendulum weight over the turning axis S—S of the pendulum. The arrangement is made in such a way that, when the plane determined by the optical axis of the telescope is vertical, the centre of the ball 70 is vertically above the axis S—S and the mark 25 lies in this plane.

In the ocular image plane of the telescope is provided an altitudinal mark 36. For the sake of simplicity this mark is supposed to be fixed in the constructional example represented by the drawings. However, it ought to be suitably provided under pendulum effect.

The tube 24 of the telescope must be assumed to be disposed in an aircraft in such a manner that, in order to counteract the drift caused by the wind, it is rotatable relatively to the aircraft about an axis which is parallel to the ocular 2 and which is vertical when the aircraft assumes horizontal position.

The drawings are based on a vertical viewing direction. The viewing direction is inclined by turning the milled head 58. The teeth 59 being in mesh with the toothed wheel 60, to this wheel is imparted such a rotation relative to the tube 24 that the turning axis T—T of the circular mark 25 is inclined towards the axis of the ocular 2 always by the same amount as the viewing axis. The arrangement of the toothed wheels 63, 64 and 65 permits the turning axis S—S of the pendulum 67 to be always parallel to the axis of the objective 1 regardless of the value of the turning movement of the wheel 60. The wheel 65 being immovable relatively to the tube 24, where as the wheels 63 and 64 are rotatably mounted on the plate 62 which is fixedly connected to the wheel 60, turning the wheel 60 imparts to the plate 62 and the supports for the wheels 63 and 64 the same turning movement. Thereby the wheel 63 rolls off from the fixed wheel 65 and to the wheel 64 is imparted such a rotation that the parallelism of the axis S—S, about which the pendulum 67 swings on the wheel body 66, and the axis of the objective 1 is maintained. When the aircraft oscillates in sideward direction, the pendulum 67 swings about the axis S—S. Consequently the arm 69 which is guided in the groove 71 of the pendulum by means of the ball 70, and also the side mark 25 are rotated about the axis T—T by a corresponding angle. The effective chord length of the angle of oscillation of the mark 25 varies according to the inclination of the axis T—T relative to the axis of the ocular 2. It is greatest when the axis T—T is parallel to the axis of the ocular 2 (that is to say when the viewing direction is vertical). It decreases in accordance with the increase in the inclination of the axis T—T relative to the ocular axis (that is to say when the inclination of the viewing direction increases relatively to the vertical line). It is zero when the axis T—T stands perpendicularly on the ocular axis (that is to say when the viewing direction is horizontal).

I claim:

1. In a sighting telescope mounted in an aircraft for rotation about an azimuthal axis, optical members determining a line of sight for aiming at targets, at least the foremost part of these optical members being movable relatively to the aircraft in such a manner that that part of the line of sight which is directed to the target may be adjusted in a plane parallel to the said axis, the said optical members comprising an objective and a side mark, a pendulum influencing this side mark, the side mark having the form of a circular arc of a radius equal to the focal length of the said objective and being cardanically so attached to the telescope that its centre coincides with the point of intersection of the two Cardan axes of the mark, the said arc striking the focal plane of the said objective, and the plane determined by the arc being parallel to the first said plane when the said pendulum is in a position corresponding to the vertical position of the said azimuthal axis.

2. In a sighting telescope mounted in an aircraft for rotation about an azimuthal axis, optical members determining a line of sight for aiming at targets, these optical members comprising a mirror so disposed in the telescope that its principal reflexion plane is parallel to the said axis, this mirror being rotatable relatively to the telescope about an axis at right angles to the said principal reflexion plane and lying in the reflecting surface of the mirror so as to adjust in the said principal reflexion plane that part of the line of sight which is directed to the target, the said optical members further comprising a side mark, a pendulum influencing this side mark, the side mark having the form of a circular arc and being cardanically so attached to the telescope that its centre coincides with the point of intersection of the two Cardan axes of the mark, the said arc lying outside the ray path which produces an image of the landscape and being parallel to the principal reflexion plane of the said mirror when the said pendulum is in a position corresponding to the vertical position of the said azimuthal axis, means for making the side mark visible in the telescope, simultaneously with the landscape, these means comprising a mirror so disposed on the telescope that its principal reflexion plane is parallel to that of the first said mirror, the said other mirror being rotatable about an axis containing the point of intersection of the two Cardan axes of the said side mark, this axis being at right angles to the principal reflexion plane of the appertaining mirror and lying in the reflecting surface of this mirror, means for so coupling the two said mirrors that they are permanently parallel to each other.

3. In a sighting telescope mounted in an aircraft for rotation about an azimuthal axis, optical members determining a line of sight for aiming at targets, these optical members comprising a mirror so disposed in the telescope that its principal reflexion plane is parallel to the said axis, this mirror being rotatable relatively to the telescope about an axis at right angles to the said principal reflexion plane and lying in the reflecting surface of the mirror so as to adjust in the said principal reflexion plane that part of the line of sight which is directed to the target, the said optical members further comprising an objective and a side mark, a pendulum influencing this side mark, the side mark having the form of a circular arc of a radius equal to focal length of the said objective and being cardanically so attached to the telescope by means of a carrier that its fixed Cardan axis is at right angles to the principal reflexion plane of the said mirror and that its movable Cardan axis lies in this plane, the centre of the said circular arc coinciding with the point of intersection of the said two Cardan axes, the said arc lying in the ray path producing an image of the landscape and striking the focal plane of the said objective, the plane determined by the arc being parallel to the principal reflexion plane of the said mirror when the said pendulum is in a position corresponding to the vertical position of the said azimuthal axis, the said carrier being mounted on the telescope so as to rotate about the fixed Cardan axis of the said side mark, the said pendulum being so mounted on this carrier as to swing in a plane at right angles to the principal reflexion plane of the said mirror and parallel to the said azimuthal axis, means for so coupling the said carrier and the said mirror that turning the mirror about its axis of rotation through a certain angle makes the carrier turn about the said fixed Cardan axis through twice this angle, and means for so coupling the said side mark to the said pendulum that oscillations of the pendulum entail equal oscillations of the mark about its movable Cardan axis.

4. In a sighting telescope mounted in an aircraft for rotation about an azimuthal axis, optical members determining a line of sight for aiming at targets, these optical members comprising a mirror so disposed in the telescope that its principal reflexion plane is parallel to the said axis, this mirror being rotatable relatively to the telescope about an axis at right angles to the said principal reflexion plane and lying in the reflecting surface of the mirror so as to adjust in the said principal reflexion plane that part of the line of sight which is directed to the target, the said optical members further comprising an objective and a side mark, a pendulum influencing this side mark, the side mark having the form of a circular arc of a radius equal to the focal length of the said objective and being cardanically so attached to the telescope that its centre coincides with the point of intersection of the two Cardan axes of the mark, the said arc lying in the ray path producing an image of the landscape and striking the focal plane of the said objective, the plane determined by the arc being parallel to the principal reflexion plane of the mirror when the said pendulum is in a position corresponding to the vertical position of the said azimuthal axis, the said objective being disposed on the telescope so as to rotate about an axis coinciding with the axis of rotation of the said mirror, means for so coupling the said objective and the said mirror that turning the mirror about its axis of rotation through a certain angle makes the objective turn about the same axis through twice this angle.

5. In a sighting telescope mounted in an aircraft for rotation about an azimuthal axis, optical members determining a line of sight for aiming at targets, at least the foremost part of these optical members being movable relatively to the aircraft in such a manner that that part of line of sight which is directed to the target may be adjusted in a plane parallel to the said axis, the said optical members comprising a lens and a side mark, stabilizing means being provided for influencing the side mark, the side mark having the form of a circular arc and being cardanically so attached to the telescope that the point of intersection of the two Cardan axes coincides with the centre of the arc and that the movable Cardan axis coincides with a diameter of the arc.

OTTO BURKHARDT.